United States Patent
Liu et al.

(10) Patent No.: US 10,818,070 B2
(45) Date of Patent: Oct. 27, 2020

(54) ARTIFICIAL INTELLIGENCE BASED VIRTUAL OBJECT AGING

(71) Applicant: Electronic Arts Inc., Redwood City, CA (US)

(72) Inventors: Han Liu, San Francisco, CA (US); Mohsen Sardari, Redwood City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/366,923

(22) Filed: Mar. 27, 2019

(65) Prior Publication Data

US 2020/0312007 A1    Oct. 1, 2020

(51) Int. Cl.
| | | |
|---|---|---|
| *G06T 15/04* | (2011.01) | |
| *G06T 17/20* | (2006.01) | |
| *G06N 3/04* | (2006.01) | |
| *A63F 13/655* | (2014.01) | |
| *G06N 3/08* | (2006.01) | |

(52) U.S. Cl.
CPC ............ *G06T 15/04* (2013.01); *A63F 13/655* (2014.09); *G06N 3/0454* (2013.01); *G06N 3/08* (2013.01); *G06T 17/20* (2013.01); *A63F 2300/695* (2013.01); *G06T 2200/04* (2013.01)

(58) Field of Classification Search
None
See application file for complete search history.

(56) References Cited

U.S. PATENT DOCUMENTS

| | | |
|---|---|---|
| 9,669,296 B1 | 6/2017 | Hibbert et al. |
| 9,782,668 B1 | 10/2017 | Golden et al. |
| 10,369,472 B1 | 8/2019 | Mattar et al. |
| 2002/0090985 A1 | 7/2002 | Tochner et al. |
| 2003/0198402 A1* | 10/2003 | Zhang ............... G06T 15/04 382/276 |
| 2006/0223635 A1 | 10/2006 | Rosenberg |
| 2007/0021166 A1 | 1/2007 | Mattila |
| 2008/0146338 A1 | 6/2008 | Bernard et al. |
| 2009/0005140 A1 | 1/2009 | Rose et al. |

(Continued)

OTHER PUBLICATIONS

Tobias Gunther, Kai Rohmer, Thorsten Grosch, "GPU-accelerated Interactive Material Aging", 2012, The Eurographics Association, in Vision, Modeling and Visualization (2012).*

(Continued)

*Primary Examiner* — Robert Bader
(74) *Attorney, Agent, or Firm* — Knobbe, Martens, Olson & Bear, LLP

(57) ABSTRACT

Embodiments of the systems and methods described herein provide a virtual object aging system. The virtual object aging system can utilize artificial intelligence to modify virtual objects within a video game to age and/or deteriorate for a certain time period. The virtual object aging system can be used to determine erosion, melting ice, and/or other environmental effects on virtual objects within the game. The virtual object aging system can apply aging, rust, weathering, and/or other effects that cause persistent change to object meshes and textures.

19 Claims, 9 Drawing Sheets

(56) References Cited

U.S. PATENT DOCUMENTS

| | | | |
|---|---|---|---|
| 2009/0028380 A1* | 1/2009 | Hillebrand | G06T 11/60 |
| | | | 382/100 |
| 2010/0306825 A1 | 12/2010 | Spivack | |
| 2012/0264518 A1 | 10/2012 | Rouille | |
| 2014/0278847 A1 | 9/2014 | Gallo | |
| 2019/0178643 A1* | 6/2019 | Metzler | G01C 11/04 |
| 2020/0030700 A1 | 1/2020 | Mattar et al. | |

OTHER PUBLICATIONS

Olivier Clement, Eric Paquette, "Adaptable aging factor for multiple objects and colorations", 2010, Elsevier, Computers & Graphics 34, pp. 460-467.*

Olivier Clement, Eric Paquette, "Enhancing Image-Based Aging Approaches", 2011, The Eurographics Association, Eurographics 2011—Short Papers.*

Hecht et al. "Automatic identification of building types based on topographic databases—a comparison of different data sources," Intl J of Cartograph (2015) vol. 1:1(18-31).

* cited by examiner

ARTIFICIAL INTELLIGENCE BASED VIRTUAL OBJECT AGING

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video games have featured various graphic styles, including game worlds centered in different time periods (such as a historical or future period relative to the real world present time) and/or that span many years or even centuries of in-game time through the course of a game's storyline. Some game systems generate game environments far into the future, while others generate graphics that reflect a time period in the past. A game's developers and/or artists typically incorporate aging of virtual objects by manually authoring or modifying visual characteristics of the virtual objects (such as their shape and/or textures) to match the time period of the game world. For example, if one portion of a game takes place in a virtual world depicting present day New York City, but a later part of the game takes place in a virtual world depicting a post-apocalyptic New York City, human artists working on the game's development would typically spend significant time creating both the original present day virtual environment and the future scenario to appear differently. This can be a very time consuming process.

SUMMARY OF EMBODIMENTS

The systems, methods, and devices of this disclosure each have several innovative aspects, no single one of which is solely responsible for the all of the desirable attributes disclosed herein.

One embodiment discloses a method for applying aging to virtual objects of a game application, wherein the method includes: applying one or more masks to an original image, wherein the original image includes a texture; inputting, to a generator model, the original image with the one or more masks, wherein the generator model is configured to apply aging effects on textures of images; receiving, from the generator model, an aged image with an aged texture, wherein the aged texture is generated based on an application of the one or more aging effects on unmasked portions of the original image; applying the texture onto a three dimensional mesh of a virtual object; identifying differences between the aged texture of the aged image and the texture of the original image, wherein each of the differences is based at least in part on a comparison of pixel values at corresponding locations in the aged image and the original image; determining a degree of deformation with respect to at least a first location in the aged texture based on one or more of the differences between the aged texture of the aged image and the texture of the original image; and causing the application of a deformation on the three dimensional mesh of the virtual object at a position corresponding to the first location in the aged texture, wherein an extent of deformation applied is based on the degree of the deformation.

In some embodiments, the method further includes: inputting, to a discriminator model, the aged image; and receiving, from the discriminator model, an indication of whether the aged image looks like a real or fake image.

In some embodiments, the generator model includes a first neural network, and the discriminator model includes a second neural network.

In some embodiments, the method further includes, during training of the generator model, updating the generator model based on a real image indication from a discriminator model by storing the one or more aging effects for a corresponding target training age.

In some embodiments, the method further includes, during training of the generator model, updating the generator model based on a fake image indication from a discriminator model by generating a different aging effect for the generator model.

In some embodiments, the original image is a photograph depicting a real world texture.

In some embodiments, the generator model is configured to apply aging effects on textures depicting a specific real world material, wherein the texture in the original image depicts the specific real world material.

In some embodiments, the comparison of pixel values at corresponding locations in the aged image and the original image comprises a comparison of brightness, and wherein the degree of deformation is based on a change in brightness between the original image and the aged image.

One embodiment includes a system for applying aging to virtual objects of a game application, wherein the system includes: one or more processors configured with computer executable instructions that configure the one or more processors to: identify a target age to age at least an original texture in an original image; input, to a generator model, the original image, wherein the generator model is configured to apply aging effects on textures of images; receive, from the generator model, an aged image with an aged texture, wherein the aged texture is generated based on the application of one or more aging effects on at least portions of the original image; apply the aged texture onto a three dimensional mesh of a virtual object; identify a difference between the aged texture of the aged image and the original texture of the original image; determine a degree of deformation based on at least one difference identified at one or more locations of the aged texture; and causing the application of a deformation on the three dimensional mesh of the virtual object based on the degree of the deformation.

In some embodiments, the target age is based on an input of a target time period from a game developer.

In some embodiments, the target age is based on an in-game time period change.

In some embodiments, the original texture comprises an artist-created texture.

In some embodiments, the original texture comprises a photographic capture of a real-life texture.

One embodiment includes a non-transitory computer-readable storage medium having stored thereon instructions that, when executed, cause at least one processor to: access an original image that includes depiction of a texture; identify a first target weathering effect; input the original image to a first weathering effect model, wherein the first weathering effect model is configured to apply weathering effects on textures of images; receive a first weathered image with a first weathered texture based on application of a first weathering effect on the texture of the original image; cause the application of the texture onto a three dimensional mesh of a virtual object; identify a difference between the first weathered texture of the first weathered image and the texture of the original image; determine a degree of deformation based on the identified difference at one or more locations of the weathered texture; and causing the application of a deformation on the three dimensional mesh of the virtual object based on the degree of the deformation at the corresponding one or more locations.

In some embodiments, the processor is further configured to receive a second weathered image based on application of a second weathering effect by a second weathering effect model on the texture of the first weathered image.

In some embodiments, the instructions further cause the at least one processor to: identify a second target weathering effect; input the original image to a second weathering effect model for the application of the second target weathering effect; receive a second weathered image with a second weathered texture based on application of the second weathering effect on the texture of the original image; receive an indication on a discrimination of a real or fake image for the second weathered image; and update the second weathering effect model based on the received indication.

In some embodiments, the application of the first weathering effect on the texture of the original image is on an unmasked portion of the texture of the original image.

In some embodiments, the processor is further configured to receive a second weathered image based on application of a second weathering effect on at least one masked portion of the texture of the original image.

In some embodiments, the application of the first weathering effect on the texture of the original image is based on a machine learning model trained to apply the first weathering effect on a particular surface type, wherein the texture of the original image is of the particular surface type.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
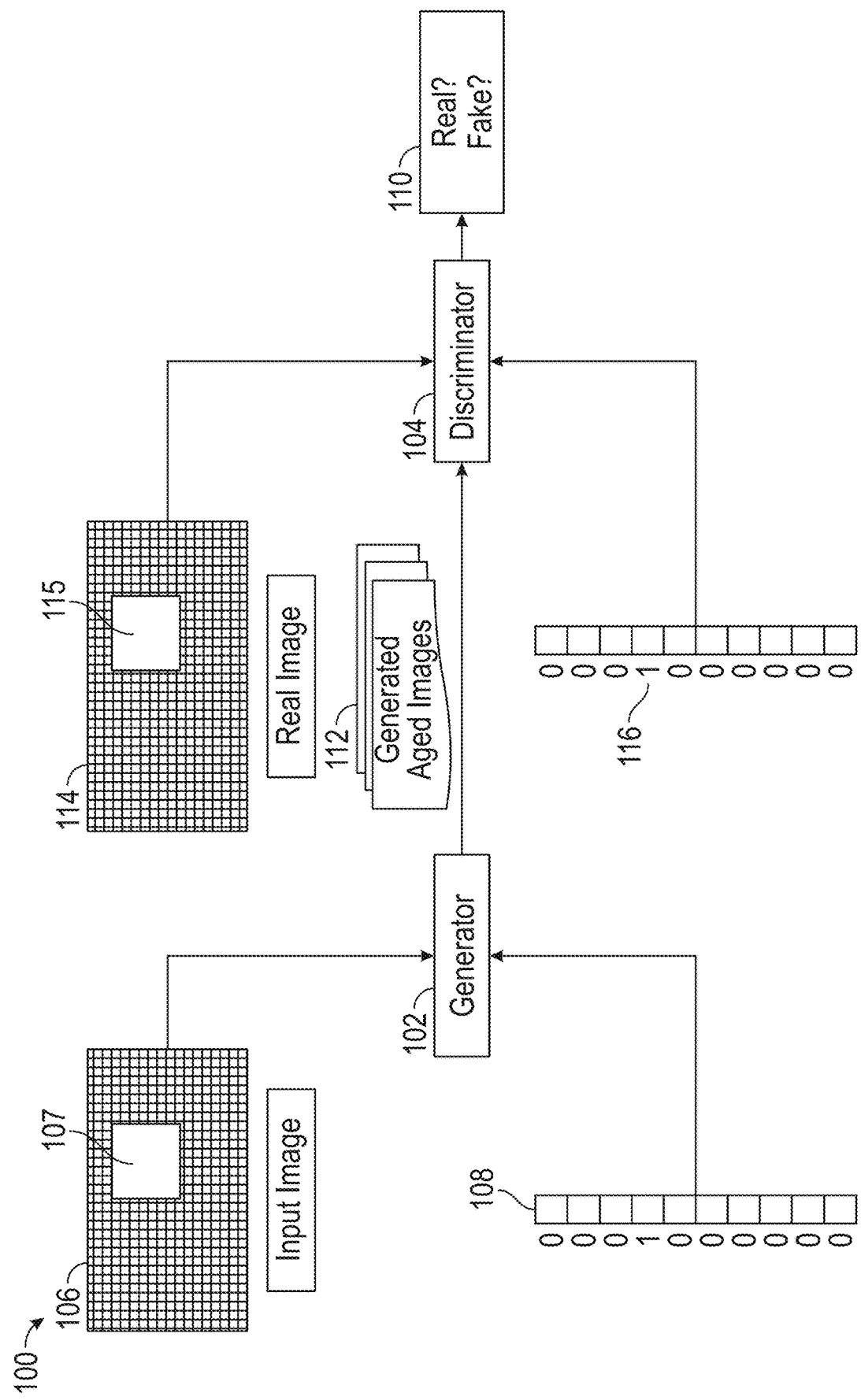
FIG. 1 provides a block diagram of a virtual object aging system and associated data flow according to some embodiments.

There is a need to effectively and efficiency enable game developers or an automated system to generate aging of virtual objects for use within game worlds with minimal or at least reduced manual input relative to traditional approaches. Traditional game development approaches age virtual objects manually, requiring developers and/or artists to tinker with many parameters. These traditional systems typically require developers to simulate the aging process by having the developer manually change certain visual parameters of a texture, such as color, and the developer seeing if the change is appropriate for the desired aging effect. Additionally, adding rust, mold, moss, weather damage, water damage, cracking, altering mineral structure, decomposition, chemical weathering, dissolving or loosening of rocks, and other effects is often done through a manual process by an artist creating modified textures or objects or a developer coding specific logic to apply a certain effect. The game developers have to estimate changes to a large number of different parameters, and then have to review these changes, which may include applying the characteristics in a simulation of an aged virtual object. Thus, simulating object aging, such as weathering effects over long periods of time, can be a very challenging problem that is difficult to perform using traditional computer technology.

Some embodiments of the present disclosure include a virtual object aging system. The virtual object aging system can utilize artificial intelligence, machine learning algorithms, neural networks, modeling, and/or the like to modify virtual objects within the game to age and/or deteriorate virtual objects to a desired effect, such as a weathering effect of a desired age relative to an input baseline. The virtual object aging system can be used to generate erosion, melting ice, and/or other environmental effects on virtual objects within the game, such as on 3D meshes of virtual objects, depending on how a particular machine learning model is trained. The virtual object aging system can apply aging, rust, weathering, and/or other effects that cause persistent changes to 3D object meshes based on weathering effects applied to textures. Moreover, the virtual object aging system can apply deformations to the 3D object meshes based on weathering effects on the textures. For example, the virtual object aging system can take a texture (e.g. a brick wall), apply weathering effects to the texture (e.g. erosion of the bricks, darkening of the color), apply the texture with the weathering effects onto a 3D object mesh of a wall of a virtual building, and deform the 3D mesh of the wall based on the weathering effects (e.g. create indents in the wall to account for the erosion).

In some embodiments, the virtual object aging system can include a generator and/or a discriminator. The generator can identify, access, and/or receive an image, such as an image with a planar surface of an object. For example, the image can include a building facade. The generator can apply a mask to the image (such as masking windows on a building facade or some other portion of the image that depicts a different material or object than the one intended to be aged) in order to limit an applied effect to a desired surface type or material (such as only the brick of a building façade, for example), then apply the effect, such as aging, to the unmasked portion. The generator can be trained for a particular surface type, texture type and/or object type. For example, the generator can be trained for a painted brick texture or an unpainted brick texture. The generator can be trained on images depicting objects of a variety of shapes with developable surfaces (e.g., a planar surface, a spherical surface, or a cylindrical surface), depending on the embodiment and desired use of the trained generator in a given instance. The virtual object aging system can flatten the developable surfaces to a plane without distortion, which then can be used for image and/or texture-based aging.

In some embodiments when training the generator, the generator can identify and/or receive an indication of a level or extent of the effect to be applied, such as a number of years to age the image. For example, the indication of a particular weathering effect and/or age can be included in training data. The generator can apply an aging effect on the unmasked portion of the image to generate an aged image. The generator can apply effects on the image, such as changes in color, and other manipulations that the generator is learning to apply through a training process. In some instances, the applied modifications or effects can initially be random or pseudo-random during the training process, and reinforcement applied within the generator for the successful modifications or effects based on output from a downstream discriminator, as will be discussed below. In a successful instance (as judged by the discriminator discussed below, for example), the generator may change the color of a brick wall of a building facade to a darker color texture with various markings and discolorations to generate 5 years of aging.

In some embodiments, the discriminator can receive the aged image generated by the generator. The discriminator can process the image to determine whether the aged image appears to be a fake or real image. The discriminator can include a machine learning algorithm, such as a neural network, that can forward propagate the aged image through the layers of the neural network and output a determination, such as a binary output indicative of a real or fake image. In some embodiments, the discriminator can include a convolutional neural network and can forward propagate the aged image through the layers of the convolutional neural network. In some embodiments, the output of the neural network can include a probability of whether the image appears to be a real image and/or a fake image. In some embodiments, the discriminator can be trained to identify a real or fake image. In some embodiments in which a generator may be configurable to age an object any of multiple ages (e.g., may be passed input indicating that the object should be aged 10 years, 30 years or 100 years), the discriminator may be separately trained for each age option. In those instances, the discriminator may be trained to identify whether an input image appears to be an image of a real building (or other object relevant to the given embodiment) of a certain age (e.g, 100 years), rather than just a real image.

In some embodiments, if the discriminator identifies the image as a real image, the generator can be trained to apply the corresponding aging effect for the indication of the level of the effect (e.g., the generator may be provided positive feedback in a learning process from the discriminator upon successfully fooling the discriminator into labeling a fake aged image generated by the generator as a real image). For example, if the discriminator identifies the aged building facade with the darker color texture as real, then the generator can store the aging effect of darkening the color texture for future use, for applying 5 years of aging. In other embodiments, the positive feedback may be used to strengthen weights within the neural network or other machine learning model underlying the generator, which may improve the generator over many training instances.

In some embodiments, if the discriminator identifies the image as a fake image, the generator can change the machine learning model to apply a different aging effect, such as changing the amount of color darkening or the change in color, or making additional variations to the image. The generator can apply the different aging effect to the image to generate a new aged image. Then, the discriminator can assess the new aged image to determine if the newly generated image appears to be real or fake.

In some embodiments, the discriminator can be trained with the generator or in advance. For example, the discriminator may be trained by passing it some real images and other fake images, where the fake images could be from the generator or another source. Whenever the discriminator gets a wrong result (e.g., labels a real image as fake, or a fake image as real), weights may be adjusted within the discriminator as part of a learning process. Thus, the discriminator improves over time in its ability to properly assess whether an image is of a real aged object, which in turn improves the realism of the generator's generated images that are capable of "fooling" the improved discriminator.

In some embodiments, the generator can be trained to age virtual objects for a plurality of different aging effects, such as different time periods, different stages of weathering, and/or the like. The virtual object aging system can use the generator to age virtual objects in-game and/or for developers.

In some embodiments, the generator can include a machine learning algorithm, such as a deep neural network, to synthesize aging effects on real world images. Advantageously, a trained generator can automatically apply aging effects on textures from real world images or artist-authored images, depending on the embodiment and training data. In some embodiments, the generator can be trained to apply aging effects to a particular texture and/or a plurality of various types of textures, such as a raw brick wall, painted brick wall, exterior of a house, a vehicle, and/or the like.

In some embodiments, the virtual object aging system can apply a Generative Adversarial Network (GAN), and/or a Conditional GAN (CGAN). The CGAN can be used to train the generator to generate images with different aging effects over varying periods of time. For example, the CGAN can generate training data sets for a particular texture type (e.g., wood, concrete, a building exterior, marble, metal, etc.), and provide the training data sets to the CGAN (such as training the discriminator to properly identify an image of a real aged object). In one instance, the training data may include photographs of a given real world object or texture type at each of various stages in an aging process (e.g., a photograph of a building taken in the year 2000 as a base image, and a photograph of the same building taken in the year 2010 as a positive example of real 10 year aging). Advantageously, training data can be automatically generated or gathered, instead of having to be prepopulated and provided by a user. The generator can determine and apply an aging effect, and generate an aged image from an input image. The discriminator can receive the aged image and determine if the aged image is real or fake. The aging effect of the generator can be updated and/or stored based on the determination of the discriminator. For example, if a particular aging effect of the generator fooled the discriminator to believe the image is real, then the generator can save the aging effect to be used in the future for a similar and/or the same level of effect (e.g. the same 5 years of aging) on a similar texture.

In some embodiments, the virtual object aging system can automatically apply aging to virtual objects in a video game when transitioning from one time period to another using a trained generator. For example, if a virtual character in a video game is traveling to a time period 10 years ahead, the generator can apply the aging effect of 10 years on images to obtain aged images of textures. Then, the textures can be applied to a 3D mesh of a virtual object. Deformation of the texture can be identified, such as by identifying a change in brightness in the texture with the aging effect, and the deformation can be applied to the 3D mesh. In some embodiments, the input image to a generator in this example may be an artist-created or photographic texture for an in-game 3D object as it should appear at year zero in the game's time, and the generator may age that texture to year ten without requiring any artist or other human input.

In some embodiments, the virtual object aging system can compare pixel values at corresponding pixel locations between an image and an aged version of that image, such as an aged image of 10 years, to determine a difference in brightness. The virtual object aging system can determine a degree of deformation (such as an indicator of a degree of erosion) to apply to a 3D mesh or other 3D object on which the texture is applied based on the changed brightness at corresponding pixel locations. The virtual object aging system can thus apply the generated aged image as a texture onto a 3D object to make the texture appear aged, while also deforming or otherwise altering the underlying 3D object to include the deformations on which the texture is applied in order to enhance the realism of the aging.

In some embodiments, the virtual object aging system of the present disclosure can be seamlessly integrated into existing virtual object generators in game engines. The virtual object aging system can provide the ability to automatically age virtual objects in a massive open-world game. As an example, according to aspects of the present disclosure, the virtual object aging system may be configured to age each of a number of different object types and/or texture types each of a number of different years, and may then be used to automatically age the appearance of an entire virtual world (e.g., including its streets, buildings, vehicles, etc.) any configurable number of years to visually reflect the in-game passage of time to the player.

In some embodiments, the virtual object aging system can be a game developer tool that a game developer can use when designing virtual spaces. The virtual object aging system can access an image, such as a texture used on a 3D object in a virtual world of the game, and the game developer can specify a desired time period for aging. The virtual object aging system can use the generator to age a texture for a desired time period. The virtual object aging system can apply the aged texture onto various 3D mesh of virtual objects. The virtual object aging system can optionally provide the aged texture to the previously trained discriminator to determine if the generated texture appears sufficiently real. For example, the game developer can access an image of a texture for a car, age the texture for 10 years using a generator that is trained to age car images or textures, and apply the aged texture to a 3D mesh of a virtual car object. The virtual object aging system can add deformations onto the 3D mesh of the virtual car object based on the difference of brightness in the pixels between the original texture and the aged texture. The game developer can place the car objects with the deformed 3D mesh into the virtual space. Alternatively, in some embodiments, the aging may occur in real time during gameplay, without any manual review of the specific instance of aging by a developer.

In some embodiments, the generator can include one or more machine learning models. For example, the generator can include a first machine learning model trained to age a brick texture, and a second machine learning model to age a wood texture. In some embodiments, the generator can include a machine learning model that can age different textures of images, such as a model that can age both a brick texture and a wood texture facade. In some embodiments, the generator can include a first machine learning model for a first aging effect, and a second machine learning model for a second aging effect. In some embodiments, the generator can include a machine learning model that can apply different aging effects, such as a model that can apply both a first and second aging effect (such as 50 years of weathering and 1000 years of weathering).

In some embodiments, the discriminator can include one or more machine learning models. For example, the discriminator can include a first machine learning model to discriminate between real and fake brick building textures, and a second machine learning model to discriminate between real and fake wood building textures. In some embodiments, the discriminator can include a machine learning model that discriminate real and fake textures of different objects, such as a model that can discriminate real and fake images of both a brick textures and a wood textures. In some embodiments, the discriminator can include a first machine learning model to discriminate real and fake images for a first aging effect, and a second machine learning model to discriminate real and fake images for a second aging effect. In some embodiments, the discriminator can include a machine learning model that can discriminate for different aging effects, such as (a brick texture with 50 years of weathering, and a brick texture with 1000 years of weathering).

In some embodiments, the virtual object aging system can apply aging effects in series. For example, the virtual object aging system can apply an aging effect on the car frame texture, to a car window texture, and then to a car wheel texture. The virtual object aging system can apply a mask to all areas except the car frame texture, apply the weathering effect to unmasked portions of the texture, remove the mask, apply a mask to all areas except the car window texture, apply the weathering effect to unmasked portions of the texture, remove the mask, apply a mask to all areas except the car wheels, and apply the weathering effect to unmasked portions of the texture. In some embodiments, the virtual object aging system can apply aging effects in parallel. One model can receive a picture of a car with masks on the windows. Another model can receive a picture of the same car with masks on the car frame.

In some embodiments, the virtual object aging system can apply a plurality of aging effects on a texture of an original image to generate a plurality of aged textures. For example, the virtual object aging system can age a texture of an original image by 5 years, 10 years, 20 years, and 50 years to generate 4 aged textures. In some embodiments, the virtual object aging system can apply an aging effect on an already aged image. For example, the virtual object aging system can apply an aging effect on a texture that is already aged for 10 years, then apply another 20 year aging effect on the 10 year aged texture to generate a 30 year aged texture.

Virtual Object Aging System Block Diagram

FIG. 1 provides a block diagram of a virtual object aging system 100 according to some embodiments. The virtual object aging system 100 can include a generator 102 and a discriminator 104 to generate aged textures. The virtual object aging system 100 can use the CGAN to train the generator to generate aging effects on textures of images.

In some embodiments, the generator 102 can receive and/or identify an input image 106. The input image 106 can include a texture. A mask 107 can cover certain portions of the input image 106. For example, the input image 106 includes a building facade of a brick building, with a mask over a window and the unmasked portions including the brick texture.

In some embodiments, the generator 102 can receive and/or identify an indication of the level of aging to be trained, such as from a vector 108. For example, virtual object aging system 100 may be training the generator 102 to generate aged brick textures at 5 year intervals. In the example of FIG. 1, the vector 108 can indicate that the generator 102 is currently being trained for the fourth interval (20 years) based on the "1" value.

In some embodiments, the generator 102 can apply the corresponding aging effect for the level of aging indicated in the vector 108 on the unmasked portions of the input image 106 to generate an aged texture. The generator 102 can apply weights, such as randomly applying weights, to the nodes of a neural network that can change one or more physical characteristics of the texture in the image. The generator 102 can forward propagate an image through its neural network to generate aged texture of the images 112.

In some embodiments, the generated aged texture of the images 112 is sent to a discriminator 104. The discriminator 104 can include another machine learning model, such as a neural network, that is trained to discriminate between real and/or fake images. The discriminator 104 can input the generated aged images 112 into a neural network. The discriminator 104 can output a determination 110 on whether each image appears to be a real or fake image. In some embodiments, the discriminator 104 can output a probability, such as a probability distribution and/or a probability value for the inputted image. For example, the discriminator can output a probability of a 0.3 that the image is a 10 year old brick wall, and/or a probability of 0.8 that the image is a 50 year old brick wall.

In some embodiments, a real image 114 and a vector 116 indicating the age of the real image is sent to the discriminator 104. The real image 114 can include a mask 115 for one or more portions of the real image 114. The discriminator 104 can forward propagate the unmasked portions of the real image 114 and determine if the real image is real or fake for the age indicated by the vector 116. This can be performed as a check as to the validity of the discriminator 104, to make sure that the discriminator 104 can identify a real image when an actual real image is passed through the discriminator 104, and to train the discriminator to better assess authenticity of images.

Training the Generator Flow Diagram

Figure 2A:
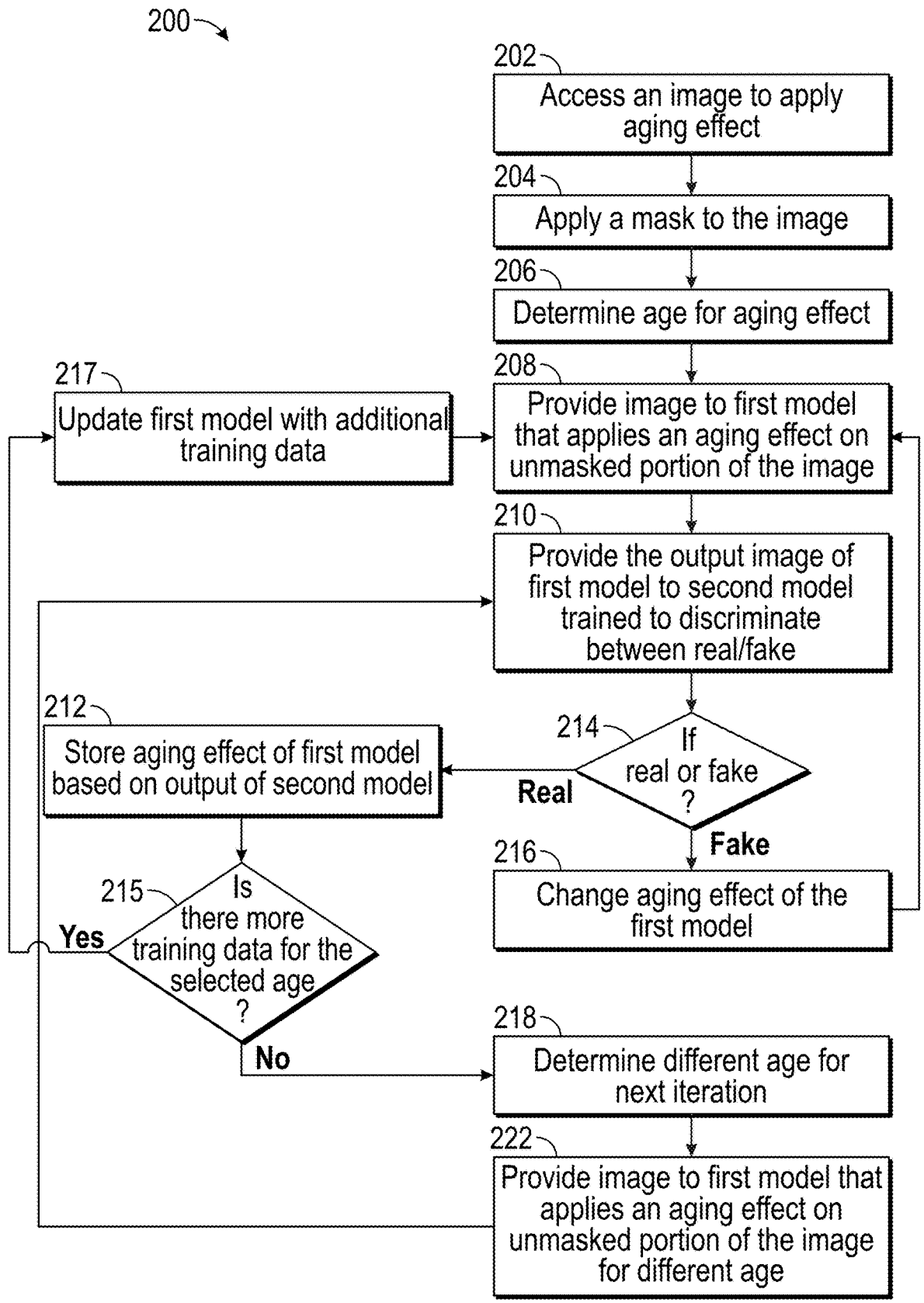
FIG. 2A provides a flow diagram for training the generator of a virtual object aging system according to some embodiments.

FIG. 2A provides a flow diagram 200 for training the generator of a virtual object aging system according to some embodiments. The process 200 can be implemented by any system that can train a machine learning model. For example, the process 700, in whole or in part, can be implemented by the generator 102 and/or the discriminator 104, or other computing system. Although any number of systems, in whole or in part, can implement the process 200, to simplify discussion, the process 200 will be described with respect to particular systems. Further, although embodiments of the process 200 may be performed with respect to variations of systems comprising various game development environments and/or game engines, to simplify discussion, the process 200, will be described with respect to the virtual object aging system.

At block 202, the virtual object aging system can access an image to apply an aging effect. For example, the generator can receive the image, such as an image for a brick wall. In some embodiments, the image can be retrieved from a database. The image can be inputted by a user, such as inputted as training data for the generator.

At block 204, the virtual object aging system can apply a mask to the image. In some embodiments, the generator can apply the mask, such as to windows of a building facade image. In some embodiments, the accessed image can already have a mask applied to the image.

At block 206, the virtual object aging system can determine an age for the aging effect. For example, the virtual object aging system can be training the generator to age texture for a painted brick building facade for 50 years.

At block 208, the virtual object aging system can provide the image to a first model that applies the aging effect on unmasked portions of the image. The generator can include the first model, and the generator can forward propagate the image applying the age effect for the determined age. The age effect can include weights for nodes of the neural network, such as weights that affect certain characteristics of the texture. For example, the generator can change the color of the painted brick wall to generate an aged texture for the painted brick wall.

At block 210, the virtual object aging system can provide the aged texture, the output texture of the first model, to a second model. The discriminator can include the second model, which is trained to discriminate between real and/or fake images. The discriminator can forward propagate the aged texture through the second model to generate an output indicative of a discrimination between real and/or fake images. The second model can be trained to discriminate whether an image appears to look real and/or fake. In a specific example instance, the second model can be trained to discriminate if the image appears to look real or fake for a painted brick building facade aged for 50 years.

At block 214, the virtual object aging system can determine if the discriminator outputted an indication that the image was a real or fake image of a painted brick building facade aged for 50 years. In some embodiments, the decisioning at block 214 can be based on a probability. For example, the process can proceed to block 212 if the probability that the image is a brick building aged for 50 years is higher than 80%, but otherwise proceed to block 216. Through each iteration, at block 216, the generator can be updated based on the probability. Advantageously, the iterations can improve the accuracy of the generator.

If the discriminator outputted an indication that the image was a fake image (e.g., does not depict a real aged object), at block 216, the aging effect of the first model can be updated. For example, a different weighting can be set for the aging effect of the first model. The process can continue to block 208 where the different weighting can be applied to the image.

If the discriminator outputted an indication that the image was a real image (e.g., depicts a real aged object), at block 212, the virtual object aging system can provide positive reinforcement to the generator that updates weights within the first model and/or may store an aging effect of the first model based on the output of the second model. In some embodiments, the virtual object aging system can reinforce the weightings in the generator that led to a real discrimination output at the discriminator, such as by increasing the weightings of the nodes. In some embodiments, the weightings of the generator are updated by backpropagating through the nodes of the generator to determine the nodes to increase and/or decrease in weightings.

At block 215, the virtual object aging system can determine if there is more training data for the selected age. If yes, then at block 217, the virtual object aging system can update the first model with the additional training data, and proceed to block 208 to apply the aging effect of the updated first model on an unmasked portion of the image.

At block 218, if there is no more training data for the selected age, the virtual object aging system can determine a different level of effect, such as 100 years of aging. At block 220, the virtual object aging system can generate an aging effect for the first training model for the different age. At block 210, the virtual object aging system can provide the image to the first model, such as the generator, to apply the aging effect for the different age on the unmasked portion of the image. The process can proceed to block 210, where the output of the generator can be inputted into the discriminator to discriminate if the image is real or fake.

Applying a Trained Generator Flow Diagram

Figure 2B:
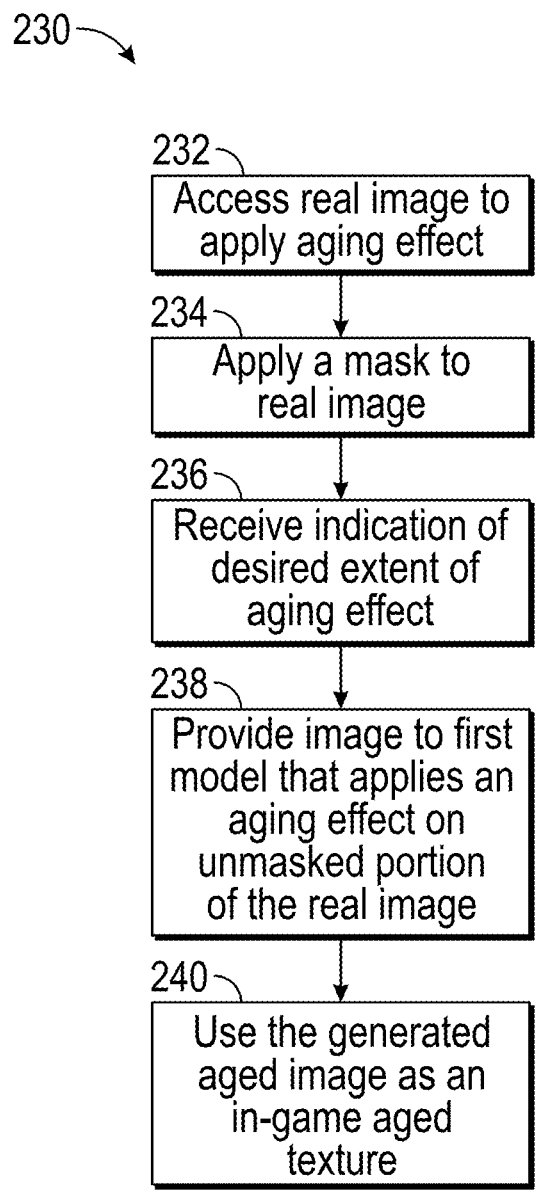
FIG. 2B provides a flow diagram for applying a trained generator of a virtual object aging system according to some embodiments.

FIG. 2B provides a flow diagram 230 for applying a trained generator of a virtual object aging system according to some embodiments. The process 230 can be implemented by any system that can apply a machine learning model. For example, the process 230, in whole or in part, can be implemented by the generator 102, or other computing system. Although any number of systems, in whole or in part, can implement the process 230, to simplify discussion, the process 230 will be described with respect to particular systems. Further, although embodiments of the process 230 may be performed with respect to variations of systems comprising various game development environments and/or game engines, to simplify discussion, the process 230, will be described with respect to the virtual object aging system.

At block 232, the virtual object aging system can access a real image to apply an aging effect. For example, the virtual object aging system can access an image of a car. In one embodiment, the real image can be an actual digital photograph of a real-life car. In another embodiment, the real image can be an image depicting a virtual car (such as a 3D rendered car object with an applied texture created by an artist for use in a video game) or a texture intended to be applied to a virtual 3D car object. The generator can be trained to age a real-life car image and/or a virtual image of a car, depending on the embodiment.

At block 234, the virtual object aging system can apply a mask to the real image. In some embodiments, the accessed real image already has a mask applied to portions of the image (or simply does not include anything other than the texture, such as wood or metal, intended to be aged by the generator). For example, the car may have masked portions of the wheel and the windows. The aging effect can be applied only to the unmasked portions of the image, such as only to the car frame itself.

At block 236, the virtual object aging system can receive an indication of a desired extent of aging effect. For example, a developer may desire aging of 50 years. In another example, in-game, a user may be traveling to another time frame, such as after resting, or time traveling, or through a portal that changes the time to 50 years later.

At block 238, the virtual object aging system can provide the image to a first model, such as the generator, that applies an aging effect on the unmasked portion of the real image. At block 240, the virtual object aging system can use the generated aged image as an in-game aged texture, in some embodiments.

Example Building Texture and Masks

Figure 2C:
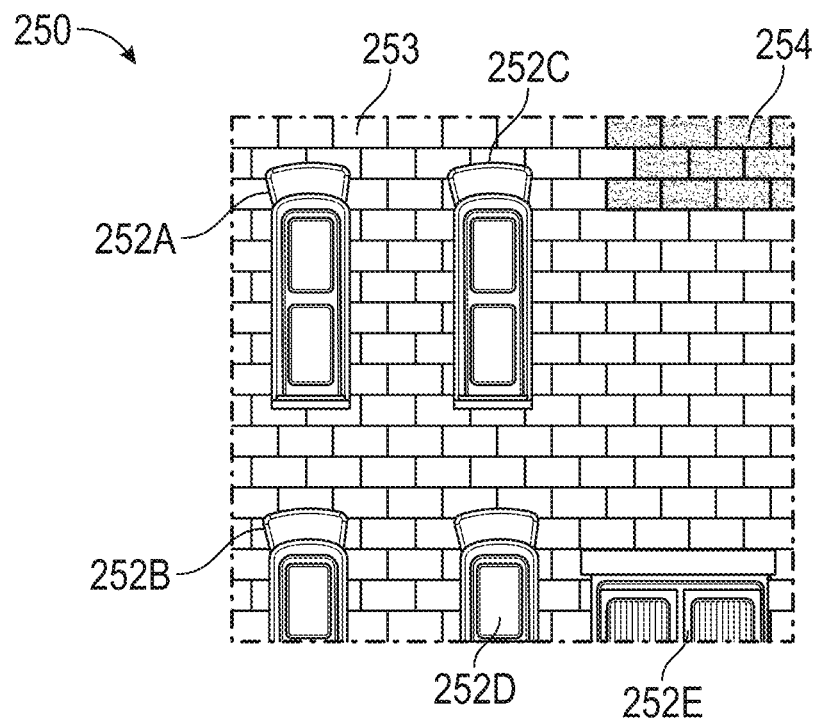
FIG. 2C provides an example of a building facade source texture according to some embodiments.

FIG. 2C provides an example of a building facade source image or texture 250 according to some embodiments. The building facade source texture 250 can be generated and/or received by any system that can train and/or apply a machine learning model. For example, the building facade source texture 250, in whole or in part, can be received by the generator 102 and/or the discriminator 104, or other computing system. Although any number of systems, in whole or in part, can apply the building facade source texture 250, to simplify discussion, the building facade source texture 250 will be described with respect to particular systems. Further, although embodiments of the building facade source texture 250 may be applied with respect to variations of systems comprising various game development environments and/or game engines, to simplify discussion, the building facade source texture 250, will be described with respect to the virtual object aging system.

In some embodiments, the building facade source texture 250 can include a source texture 254 for the building, and features, such as windows 252A, 252B, 252C, 252D, and a door 252E.

Figure 2D:
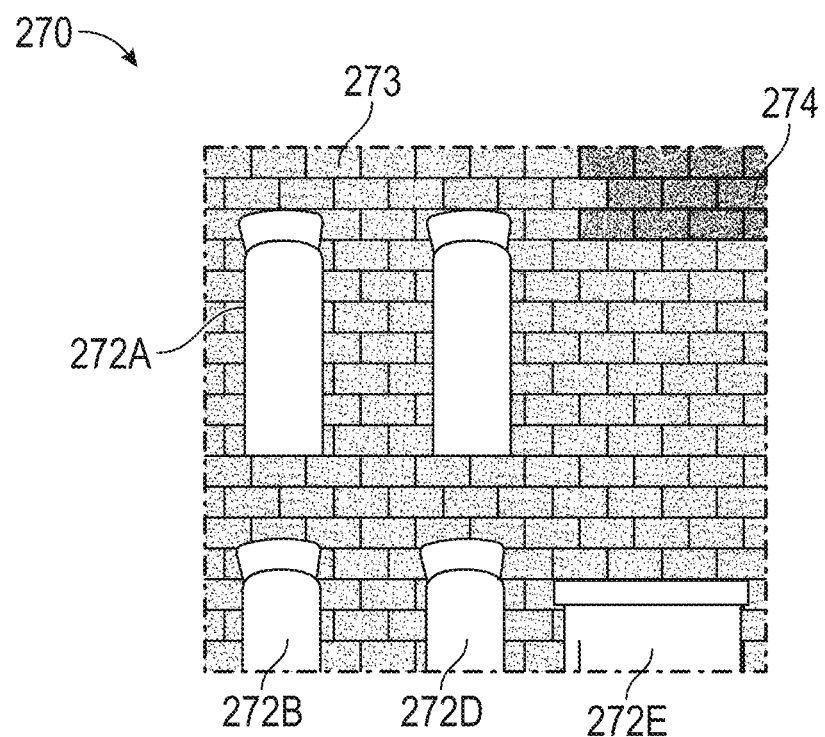
FIG. 2D provides an example of an aged building facade on the unmasked portions of the texture of FIG. 2C according to some embodiments.

FIG. 2D provides an example of an aged building facade, where windows (e.g., features not aged by the generator in this example) have been masked out. FIG. 2D illustrates the effects of aging applied by the generator to the unmasked portions of the texture 270 according to some embodiments. The aged building facade effects applied on the unmasked portions of the texture 270 can be generated and/or received by any system that can train and/or apply a machine learning model. For example, the aged texture 270, in whole or in part, can be generated by the generator 102 and/or the discriminator 104, or other computing system.

In some embodiments, the virtual object aging system can apply masks 272A, 272B, 272C, 272D, and 272E (as shown in FIG. 2D) to the windows 252A, 252B, 252C, 252D, and the door 252E shown in FIG. 2C. The generator can apply an aging effect on the texture 253 to generate an aged texture 273. The virtual object aging system can identify that the texture includes a darkened portion 254, which can be aged to include a further darkened portion 274 in the texture. In some embodiments, the generator that generates the aged texture 273 is trained to generate an aging effect on brick textures of a building and/or brick textures of walls with a planar surface.

Applying the Aged Texture to Mesh of 3D Object Flow Diagram

Figure 3A:
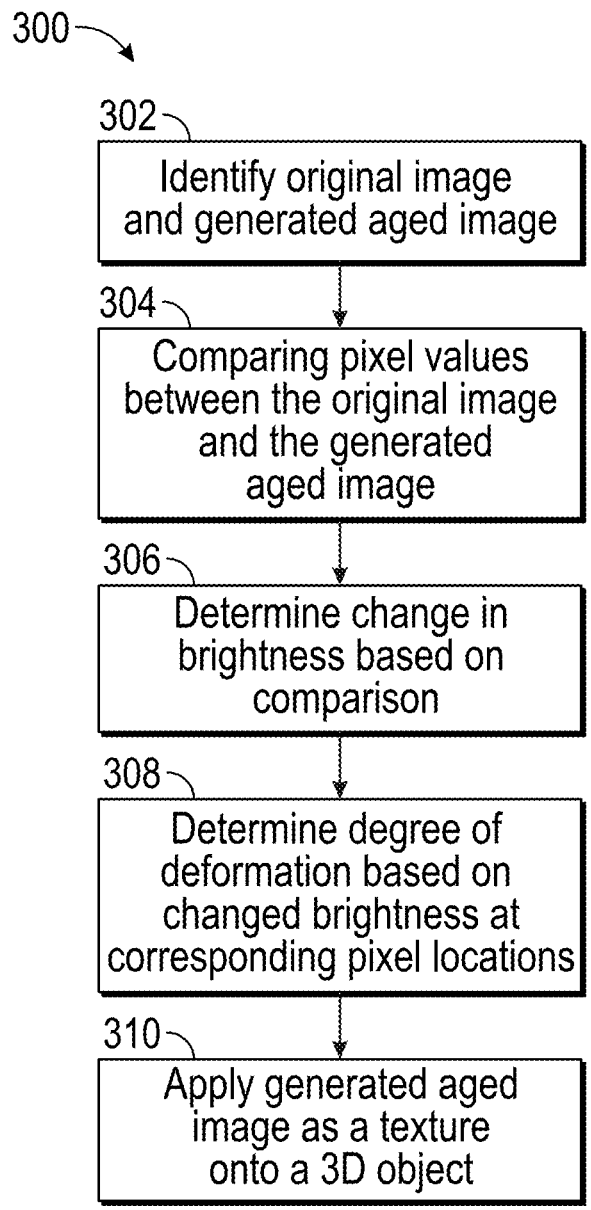
FIG. 3A provides a flow diagram for applying the aged texture to a mesh of a 3D object according to some embodiments.

FIG. 3A provides a flow diagram 300 for applying the aged texture to a mesh of a 3D object according to some embodiments. The process 300 can be implemented by any system that can apply a texture to a 3D object mesh. For example, the process 300, in whole or in part, can be implemented by a virtual object aging system, or other computing system. Although any number of systems, in whole or in part, can implement the process 300, to simplify discussion, the process 300 will be described with respect to particular systems. Further, although embodiments of the process 300 may be performed with respect to variations of systems comprising various game development environments and/or game engines, to simplify discussion, the process 300, will be described with respect to the virtual object aging system.

At block 302, the virtual object aging system can receive a generated aged texture based on the application of a first model, such as a trained generator, to an original image. For example, the virtual object aging system can identify an original texture of a building facade from an image and a generated aged texture of a building facade 50 years older than the texture of the original image.

At block 304, the virtual object aging system can compare pixel values between the original image and the generated image with the aged texture that was generated by the generator. The comparisons may be between each pixel in the original image and the pixel at the same location in the generated image (e.g., at the same x, y value or image coordinates within the two images). Thus, in one embodiment, comparing pixel values for a given original image and corresponding aged image may involve thousands of pixel-level comparisons to determine an extent that each pixel was modified in the aging process.

At block 306, the virtual object aging system can determine a change in brightness based on the comparison. For example, the virtual object aging system can compare pixels of the original image with the generated image to determine a change in brightness for each of a potentially large number of pixels. For example, in one embodiment, the change in brightness may be determined for each pixel location that was unmasked (e.g., subject to aging by the generator) in the original image. For example, in one embodiment, brightness at each pixel location in an image may be represented as a value from 0-255, such that determining the change in brightness between corresponding pixel locations in the two images would involve subtracting one value in the 0-255 range from another value in the 0-255 range.

At block 308, the virtual object aging system can determine, infer or approximate a degree of deformation (such as deformation caused by erosion) based on the changed brightness at corresponding pixel locations. The image differences in brightness can be an indication of erosion, which can be used to represent a degree of deformation for the texture. Thus, a degree of darkening of a pixel between the original image and the aged image may be used as a proxy by the virtual object aging system to represent the degree of erosion that would be present at that point on a real world object as a result of aging. In some embodiments, the virtual object aging system may apply a rule set or scale to convert brightness changes to an extent of deformation (e.g., a brightness difference of 20 leads to a deformation of 1 unit, while a brightness difference of 40 leads to a deformation of 2 units).

At block 310, the virtual object aging system can apply the deformation on a 3D mesh of a virtual object based on the corresponding locations of deformation on the texture. The darker stains that are indicated by the pixel difference between the original image and the aged image can represent a deeper degree of erosion, and thus, the virtual object aging system can apply a deeper dent along the direction of an inverse normal vector at the vertex. For example, a brick may have certain indents of erosion over time and may not have the same shape as a new brick. The virtual object aging system can apply an aged brick texture to a 3D mesh of a brick wall. Then, the virtual object aging system can determine deformation of the aged brick texture based on a pixel-to-pixel difference between the aged brick texture and the original brick texture to determine a degree of deformation after aging of the brick texture. The deformation can be applied to the 3D mesh at the corresponding locations (e.g., the vertex or point of the mesh on which that pixel of the texture is rendered) where there are degrees of deformation.

Example Building Texture and Masks

FIGS. 3B, 3C, 3D, 3D and 3F provide examples of an aging or weathering effect from imaging differences between the original image 350 and the aged image 370 according to some embodiments. The weathering effect from imaging differences between the original image and the aged image can be generated and/or received by any system that can train and/or apply a machine learning model. For example, the weathering effect from imaging differences between the original image and the aged image, in whole or in part, can be applied by the virtual object aging system, or other computing system. Although any number of systems, in whole or in part, can apply the weathering effect from imaging differences between the original image and the aged image, to simplify discussion, the weathering effect from imaging differences between the original image and the aged image will be described with respect to particular systems.

Figure 3B:
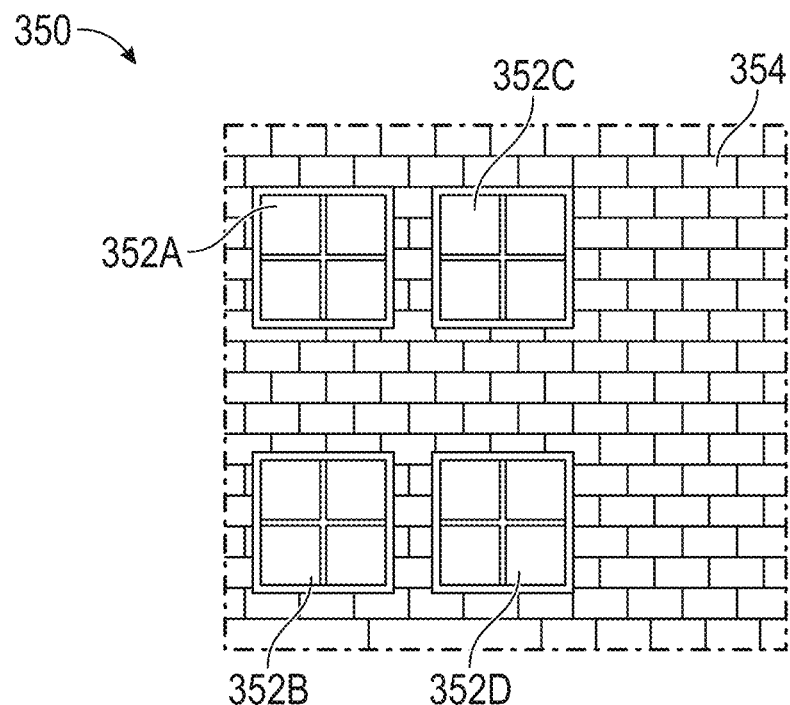
FIGS. 3B, 3C, 3D, 3E and 3F provide examples of a weathering effect from imaging differences between the original image and the aged image according to some embodiments.

In FIG. 3B, an original image 350 including a texture 354 and masks 352A, 352B, 352C, and 352D can be inputted into a model to apply an aging effect. For example, the generator can receive a texture 354. In some embodiments, the original image includes the masks 352A, 352B, 352C, and 352D. In some embodiments, the virtual object aging system can apply a mask to certain portions of the original image to isolate the texture.

Figure 3C:
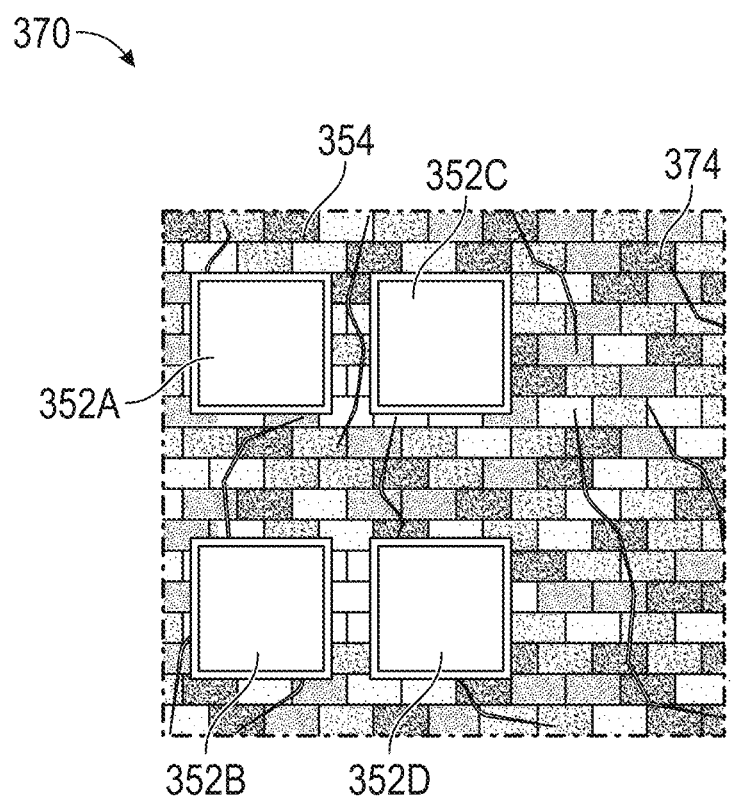

In FIG. 3C, the generator can generate an aged texture 374 by applying the aging effect through its trained machine learning model. The generator can be trained to apply an aging effect for the texture of the original image. The generator can be trained to apply a different aging effect than the aging effect illustrated in FIG. 2D. The generator can apply a certain time of aging, such as 50 years of aging on a texture. For example, the generator can generate mold, cracks, erosion, darkening, and/or the like on a brick texture of an input image.

Figure 3D:
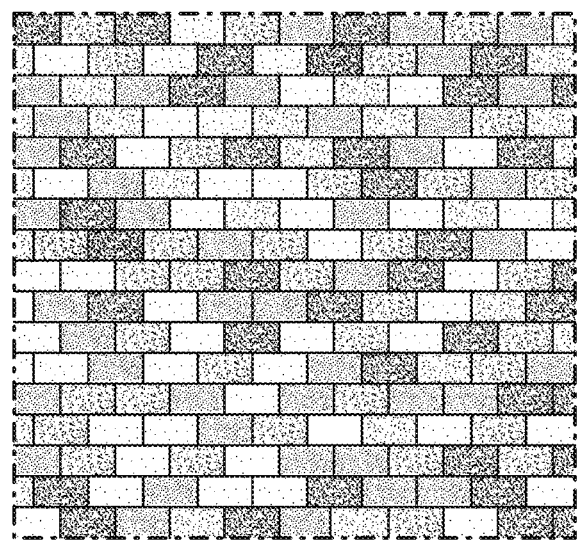
Figure 3E:
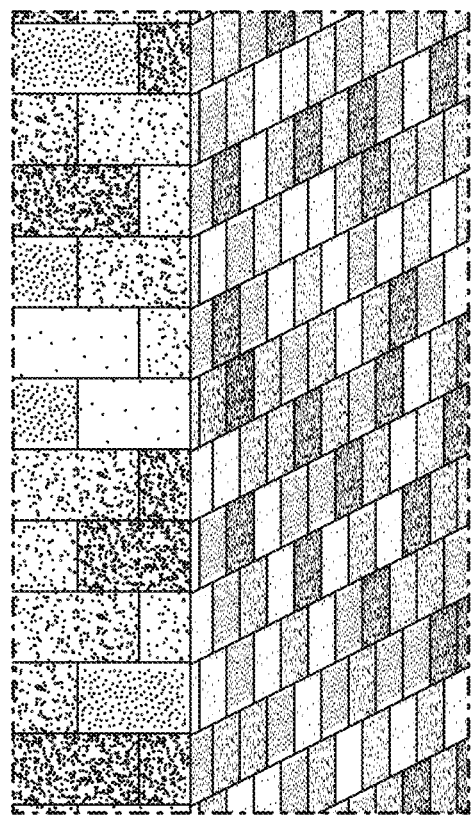

In FIG. 3D, the virtual object aging system can apply the texture onto an underlying 3D mesh of an object. For example, the 3D mesh of a brick wall can include the aged texture 374 generated by the generator. The 3D mesh can include the original 3D mesh shape (which may be a relatively flat surface in this example) with the aged texture 374 placed on top of the 3D mesh. FIG. 3E provides a side view of the 3D mesh with the aged texture applied, illustrating that the surface is relatively flat prior to deforming the 3D mesh, as will be described below.

Figure 3F:
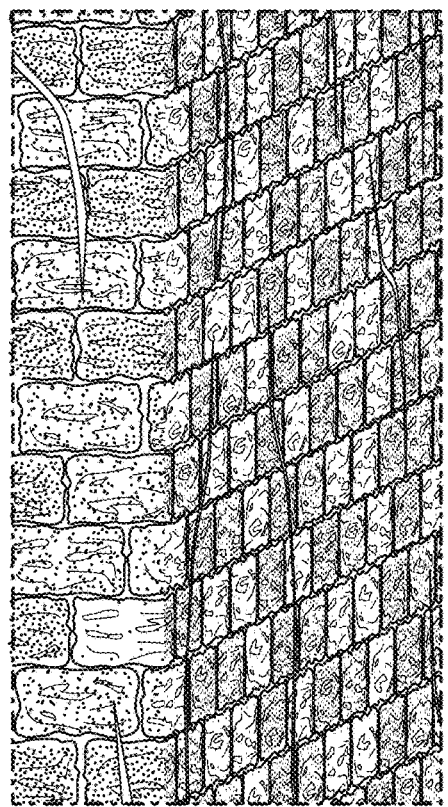

In FIG. 3F, the deformations of the aging effect can be determined and applied onto the 3D mesh. The virtual object aging system can compare the texture 354 of the original image with the texture 374 of the generated aged image. The virtual object aging system can compare individual pixel locations between the original image and the generated aged image in order to determine a level of deformation (such as deformation from erosion). Thus, the deformations can be applied to the 3D mesh to make it look more realistic to an aged brick wall, such as deformations including cracking or erosion. For example, the generator can generate cracking on an aged brick texture. The virtual object aging system can identify a difference in pixel brightness in the area of cracking. The pixel brightness can correspond to an indent to be placed onto the 3D mesh. The virtual object aging system can apply the aged brick texture onto the 3D mesh with the cracking. The virtual object aging system can identify the locations on the 3D mesh that correspond to the cracking on the texture, and indent the area on the 3D mesh (such as adding deformations in the area).

In some embodiments, a pixel can correspond to a vertex on the 3D mesh. When the aged texture is applied to the 3D mesh, the pixel of the aged texture can correspond to the deformation to apply onto the 3D mesh. Each pixel can be assessed to determine how much deformation from the weather effects should be applied on the mesh beneath that pixel (based on, for example, the brightness change as discussed above). Thus, the darkness of the texture can be a proxy for changing the depth of the mesh. For example, if the image includes a certain darkness at an eroded location, the virtual object aging system can identify this location based on the pixel comparison, and apply more of an aging effects at a position on the 3D mesh or other 3D object data corresponding to that location.

Example Mesh Vertices and Normal Vector

Figure 4:
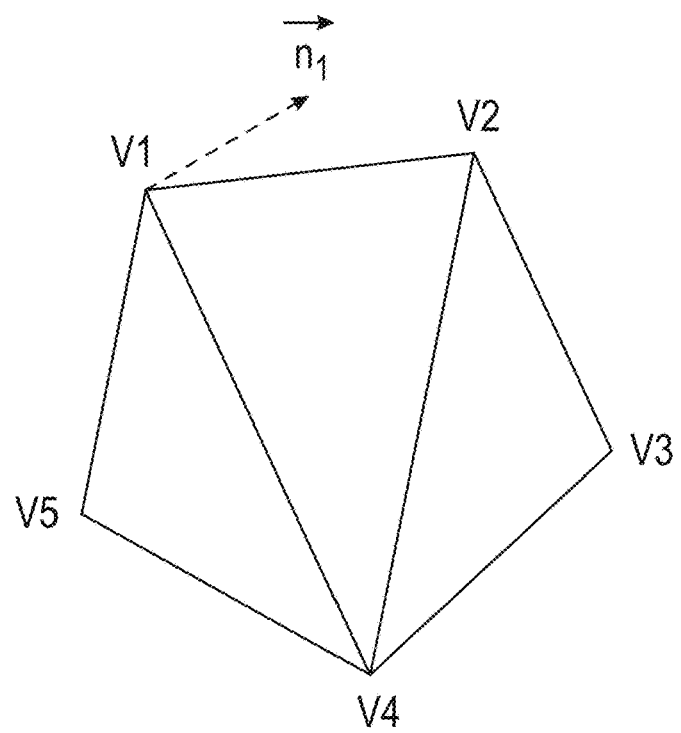
FIG. 4 provides an example of mesh vertices and a normal vector according to some embodiments.

FIG. 4 provides an example of mesh vertices and a normal vector 400 according to some embodiments. The mesh vertices and a normal vector 400 can be generated and/or applied by any system that can apply a texture to a 3D mesh or alter a 3D mesh. To simplify discussion, the mesh vertices and a normal vector 400, will be described with respect to the virtual object aging system.

FIG. 4 illustrates vertices, such as V1, V2, V3, V4, V5 of a 3D mesh. Each vertex can be identified to correspond to a pixel of the aged texture, such as the pixel that appears at that location on the mesh when the texture is placed on the mesh for 3D rendering. A relative position of a given vertex in the 3D mesh can be adjusted to reflect the deformation at the vertex. For example, the aged texture can include erosions at certain portions of the brick wall, and the pixels can correspond to the erosion areas. Then, the vertexes corresponding to the pixels can be deformed accordingly. In the example, $V_1$ can be deformed or eroded (e.g., its position or location in 3D space can be altered) the determined extent in the direction of the inverse normal vector at that vertex.

Overview of Computing Device

Figure 5:
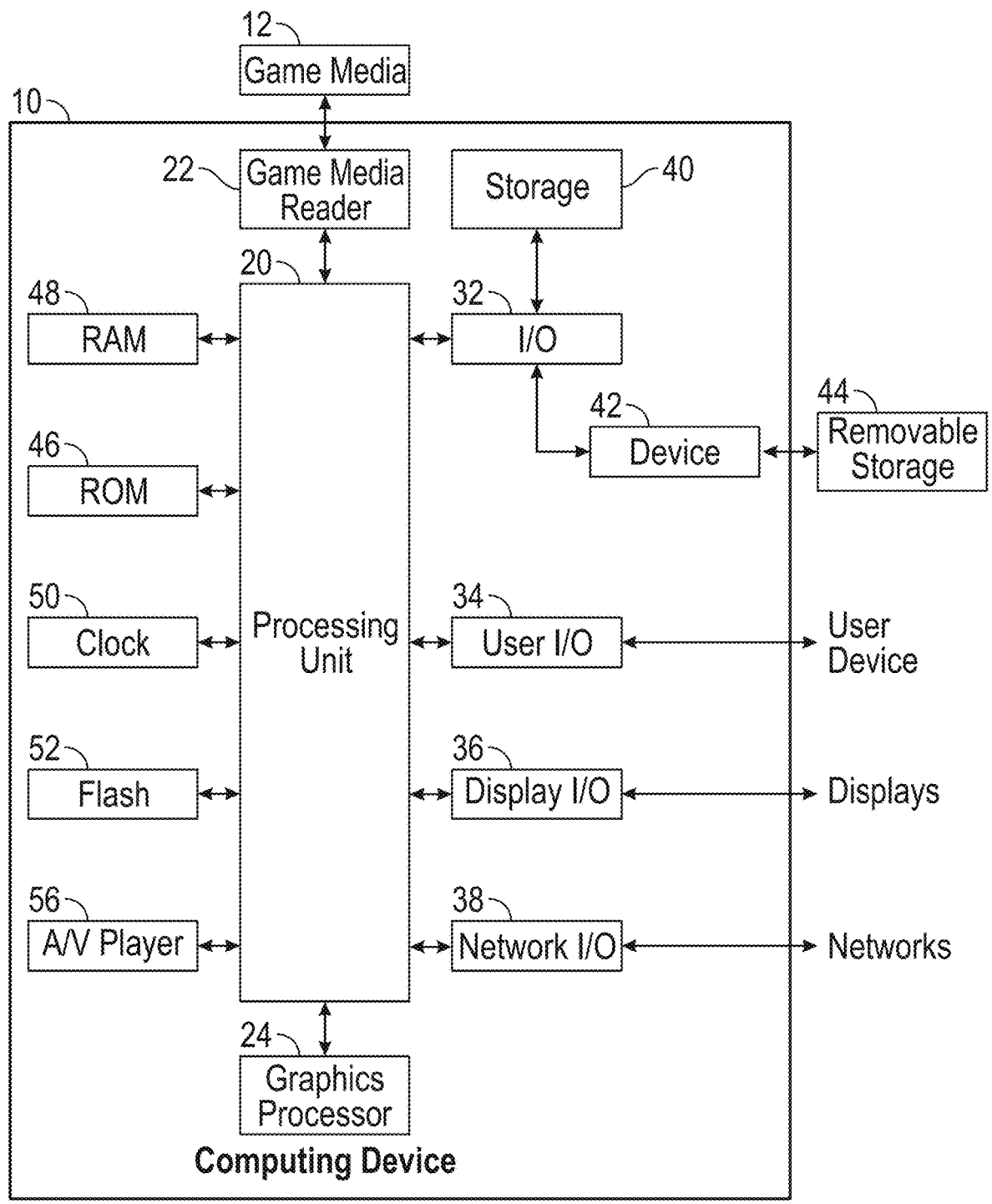
FIG. 5 illustrates an embodiment of computing device that may implement aspects of the present disclosure.

FIG. 5 illustrates an embodiment of computing device 10. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method for applying aging to virtual objects of a game application, wherein the method includes:

applying one or more masks to an original image, wherein the original image includes a texture;

inputting, to a generator model, the original image with the one or more masks, wherein the generator model is configured to apply aging effects on textures of images;

receiving, from the generator model, an aged image with an aged texture, wherein the aged texture is generated based on an application of the one or more aging effects on unmasked portions of the original image;

applying the texture onto a three dimensional mesh of a virtual object;

identifying differences between the aged texture of the aged image and the texture of the original image, wherein each of the differences is based at least in part on a comparison of pixel values at corresponding locations in the aged image and the original image;

determining a degree of deformation with respect to at least a first location in the aged texture based on one or more of the differences between the aged texture of the aged image and the texture of the original image; and causing the application of a deformation on the three dimensional mesh of the virtual object at a position corresponding to the first location in the aged texture, wherein an extent of deformation applied is based on the degree of the deformation.

2. The method of claim 1, wherein the method further includes:
inputting, to a discriminator model, the aged image; and
receiving, from the discriminator model, an indication of whether the aged image looks like a real or fake image.

3. The method of claim 2, wherein the generator model includes a first neural network, and the discriminator model includes a second neural network.

4. The method of claim 1, wherein the method further includes, during training of the generator model, updating the generator model based on a real image indication from a discriminator model by storing the one or more aging effects for a corresponding target training age.

5. The method of claim 1, wherein the method further includes, during training of the generator model, updating the generator model based on a fake image indication from a discriminator model by generating a different aging effect for the generator model.

6. The method of claim 1, wherein the original image is a photograph depicting a real world texture.

7. The method of claim 1, wherein the generator model is configured to apply aging effects on textures depicting a specific real world material, wherein the texture in the original image depicts the specific real world material.

8. A method of claim 1, wherein the comparison of pixel values at corresponding locations in the aged image and the original image comprises a comparison of brightness, and wherein the degree of deformation is based on a change in brightness between the original image and the aged image.

9. A system for applying aging to virtual objects of a game application, wherein the system includes:
one or more processors configured with computer executable instructions that configure the one or more processors to:
identify a target age to age at least an original texture in an original image;
input, to a generator model, the original image, wherein the generator model is configured to apply aging effects on textures of images;
receive, from the generator model, an aged image with an aged texture, wherein the aged texture is generated based on the application of one or more aging effects on at least portions of the original image;
apply the aged texture onto a three dimensional mesh of a virtual object;
identify a difference between the aged texture of the aged image and the original texture of the original image;
determine a degree of deformation based on at least one difference identified at one or more locations of the aged texture; and
causing the application of a deformation on the three dimensional mesh of the virtual object based on the degree of the deformation.

10. The system of claim 9, wherein the target age is based on an input of a target time period from a game developer.

11. The system of claim 9, wherein the target age is based on an in-game time period change.

12. The system of claim 9, wherein the original texture comprises an artist-created texture.

13. The system of claim 9, wherein the original texture comprises a photographic capture of a real-life texture.

14. A non-transitory computer-readable storage medium having stored thereon instructions that, when executed, cause at least one processor to:
identify a target age to age at least an original texture in an original image;
input, to a generator model, the original image, wherein the generator model is configured to apply aging effects on textures of images;
receive, from the generator model, an aged image with an aged texture, wherein the aged texture is generated based on the application of one or more aging effects on at least portions of the original image;
apply the aged texture onto a three dimensional mesh of a virtual object;
identify a difference between the aged texture of the aged image and the original texture of the original image;
determine a degree of deformation based on at least one difference identified at one or more locations of the aged texture; and
causing the application of a deformation on the three dimensional mesh of the virtual object based on the degree of the deformation.

15. The non-transitory computer-readable storage medium of claim 14, wherein the target age is based on an input of a target time period from a game developer.

16. The non-transitory computer-readable storage medium of claim 14, wherein the target age is based on an in-game time period change.

17. The non-transitory computer-readable storage medium of claim 14, wherein the original texture comprises an artist-created texture.

18. The non-transitory computer-readable storage medium of claim 14, wherein the target age is based on an input of a target time period from a game developer.

19. The non-transitory computer-readable storage medium of claim 14, wherein the original texture comprises a photographic capture of a real-life texture.

* * * * *